Patented Dec. 20, 1949

2,492,087

UNITED STATES PATENT OFFICE 2,492,087

PREPARATION OF GRANULAR COPOLYMERS OF VINYL CHLORIDE AND VINYL ACETATE

Massimo Baer, Springfield, Mass., assignor to Monsanto Chemical Company, St. Louis, Mo., a corporation of Delaware No Drawing. Application December 30, 1948, Serial No. 68,436

4 Claims. (Cl. 260—23)

This invention relates to vinyl chloride-vinyl acetate copolymers.

In my co-pending patent application, Serial No. 691,412, filed August 17, 1946, now Patent No. 2,476,474, there is disclosed and claimed a process for the polymerization of vinyl halide-containing materials in aqueous suspension, there being dissolved in the aqueous phase thereof an heteropolymer of vinyl acetate and maleic acid or anhydride. This process leads to granular products of high quality. However, improvement in certain characteristics of the polymer granules would be advantageous.

It is an object of this invention to provide vinyl chloride-vinyl acetate copolymers in the form of fine grains. A particular object of this invention is to provide a method for improving the granular products obtained by polymerizing mixtures of vinyl chloride and vinyl acetate in the presence of an aqueous solution of an heteropolymer of vinyl acetate and maleic acid or anhydride.

These and other objects are accomplished according to this invention by polymerizing mixtures of vinyl chloride and vinyl acetate in aqueous suspension, the aqueous phase thereof having dissolved therein an heteropolymer of vinyl acetate and maleic acid or anhydride, in the presence of glyceryl mono-octadecanoate.

The following example is illustrative of the present invention, but is not to be construed as limitative thereof. Where parts are mentioned, they are parts by weight.

Example 200 parts of water are placed in a glass-lined autoclave and then 0.3 part of the heteropolymer of vinyl acetate and maleic anhydride is added and dissolved in the water by heating and stirring the mixture. Thereafter, 0.3 part of lauroyl peroxide and 0.4 part of glyceryl mono-octadecanoate are introduced and the air in the autoclave is swept out with vinyl chloride gas. The autoclave is then sealed and 90 parts of monomeric vinyl chloride and 10 parts of vinyl acetate are introduced. The resulting mixture is heated and stirred at 50° C. for 30 hours. As a result of treatment, substantially all of the vinyl chloride and the vinyl acetate are polymerized into a copolymer, i. e., more than 95%. The polymeric product which comprises a powder is recovered from the suspending medium by centrifuging the aqueous suspension. The recovered polymer is washed with water and dried.

Examination of the above product shows that it is characterized by exceedingly fine particle size and improved colloiding characteristics especially in the presence of plasticizers.

In general, it is found that the polymers produced according to the invention tend to have a smaller average particle size than polymers prepared in the absence of glyceryl mono-octadecanoate. A further advantage in the products of the invention is their ease of colloiding. This is particularly evident in colloiding the polymers in the presence of plasticizers. Polymers produced according to the invention are also characterized by improved heat stability, being superior in this respect to polymers prepared by the same process except that the glyceryl mono-octadecanoate is omitted.

The copolymers of the invention may be admixed with plasticizer by various means. For example, the resin and plasticizer may be admixed on heated rolls at a suitable temperature, e. g., 220–300° F. Various plasticizers may be used such as dioctyl phthalate, dibutyl phthalate, tricresyl phosphate, etc., in compatible proportions. 5–150 parts of plasticizer for every 100 parts of resin results in products ranging from relatively hard to very soft materials. 75–125 parts plasticizer for every 100 parts of resin is a more preferred range.

The amount of the glyceryl mono-octadecanoate that is used may be substantially varied. Thus, as little as 0.01% based on the amount of monomeric material has a definite effect on the particle characteristics of the polymeric product. Usually, not more than 5% is desirable. A preferred range of proportions is 0.05–2% of the additive based on the amount of the monomeric material.

The heteropolymer used in the example is made by copolymerizing one gram molecular weight of vinyl acetate with one gram molecular weight of maleic anhydride in the presence of 60 cc. of benzene and 0.13 gram of benzoyl peroxide at 50° C. for 72 hours. The product, after being freed from the benzene by drying at 60–70° C., is in the form of a fine powder.

In general, the heteropolymers of vinyl acetate and maleic acid or anhydride used in the process of the invention may be made by usual methods of producing such polymeric products, e. g., in solution, in mass, or in a liquid which is a solvent for the monomeric materials, but not for the heteropolymer. Illustrative examples are set forth in my co-pending patent application, Serial No. 691,412, filed August 17, 1946. A particularly preferred procedure is set forth in my co-pending application, Serial No. 790,221, filed December 6, 1947, whereby especially high molecular weight products are obtained by polymerization in the presence of a small amount of a material which is a solvent for the monomeric materials, but not for the heteropolymer.

Usually, maleic anhydride is preferred over maleic acid as the copolymerizing material in view of the faster polymerization rates which result and the greater solubility of the anhydride. Since on solution of the vinyl acetate-maleic anhydride heteropolymer in water, the anhydride groups hydrolyze to carboxyl groups, there is no disadvantage in using this heteropolymer.

In preparing the heteropolymers in the presence of a solvent for the monomers which is a non-solvent for the polymer, such liquids may be used as benzene, toluene, xylene, hexane, chlorobenzene, chlorotoluene, chloroxylene, dichloroethylene, trichloroethylene, and the corresponding bromo and fluoro compounds.

The heteropolymer-containing suspending agents may be made by polymerizing mixtures of vinyl acetate and maleic acid or anhydride in varying molar ratios, e. g., from 1:9 to 9:1. Usually, it is preferred that the ratio of maleic acid or anhydride to vinyl acetate does not exceed 1:1 since the use of an excess of maleic acid or anhydride may be undesirable in some cases. However, it may be desirable that the ratio of vinyl acetate to anhydride exceed 1:1. For example, the ratio may be as high as 9:1, as pointed out above.

Heteropolymers of vinyl acetate and maleic acid or anhydride possess a substantial solubility in water without the use of compounds forming salts therewith. Usually the aqueous solutions thereof are clear. However, the products resulting from polymerizing mixtures of vinyl acetate and maleic acid or anhydride containing a substantial molar excess of vinyl acetate, i. e., more than 1.5–2.0 mols of vinyl acetate for every mol of maleic acid or anhydride, tend to form hazy aqueous solutions. While these heteropolymers may be used as suspending agents and are comprehended by the present invention, it is preferred to use the heteropolymers which form clear aqueous solutions without the addition of salt-forming materials since these heteropolymers are more effective as suspending agents.

In carrying out the process of the invention, the polymerizing temperature may be substantially varied, and the temperature employed is governed by the particular characteristics desired in the polymeric material. Usually, temperatures of 30–100° C. are employed. Generally, only a small concentration of the dispersing agent of the invention is necessary. For example, 0.005–2.0% and, more particularly, 0.01–0.5% based on the amount of water used, is usually sufficient. However, larger amounts may be employed when desired, for example, up to the limit of solubility of the heteropolymer in the water. The optimum quantity of the dispersing agent depends upon the number of factors, for example, the ratio of water to monomer. Thus, as the water : monomer ratio is increased, the ratio of suspending agent to water may be decreased. Another factor affecting the amount of the suspending agent required is the rate at which the particular charge polymerizes. In general, the faster the rate of polymerization, the smaller is the amount of suspending agent required. Other factors affecting the optimum amount of suspending agent include the degree of fineness desired in the polymeric product and the speed of agitation.

In carrying out the polymerization process of the invention it is generally preferred that a water : monomer weight ratio of at least 1:1 be used, but generally, the water : monomer ratio does not exceed 9:1. The dispersing agent concentrations mentioned above may be used within these limits of water : monomer ratios.

As indicated above, it is desirable in carrying out the polymerization process of the invention to substantially free the atmosphere above the polymerizing mixture from oxygen by replacing the air prior to polymerization with carbon dioxide, vinyl chloride, nitrogen or other inert gas. This may be done by sweeping out the charge to partial vacuum, thereby sweeping out the air with vapors from the charge.

In place of lauroyl peroxide used in the example, other water-insoluble catalysts may be used such as benzoyl peroxide, ditertiary butyl peroxide, oleyl peroxide, toluyl peroxide and the like. Mixtures of two, three or more of these and other catalysts may be used when desired. In certain cases, the catalyst may be eliminated, for example, when rapid polymerization is obtained in the absence of catalyst. In certain cases, the action of light may be helpful in expediting the polymerization.

The above catalysts are also illustrative of catalysts which may be used in making the heteropolymer dispersing agent.

The relative proportions of vinyl chloride and vinyl acetate subjected to polymerization in accordance with the invention may be substantially varied. Preferably, however, a predominant proportion, i. e., more than 50% by weight of the mixture of monomers is vinyl chloride. According to a particularly preferred embodiment of the invention, 5–20 parts by weight of vinyl acetate are used for every 95–80 parts by weight of vinyl chloride.

This application is a continuation-in-part of my co-pending application, Serial Number 790,222, filed December 6, 1947.

It is obvious that many variations may be made in the products and processes of this invention without departing from the spirit and scope thereof as defined in the appended claims.

What is claimed is:

1. In a process wherein a mixture of vinyl chloride and vinyl acetate is polymerized while dispersed in an aqueous medium having dissolved therein as a dispersing agent a heteropolymer of vinyl acetate and a substance from the group consisting of maleic acid and maleic anhydride, the step which comprises incorporating in the aqueous medium 0.01–5%, based on the monomeric materials of glyceryl mono-octadecanoate.

2. A process as defined in claim 1 in which 0.05–2% of glyceryl mono-octadecanoate is used.

3. A process as defined in claim 1 in which a predominant amount of the monomeric materials is vinyl chloride.

4. A process as defined in claim 1 in which 5–20 parts of vinyl acetate are polymerized for every 95–80 parts of vinyl chloride.

MASSIMO BAER.

No references cited.